2,862,015
Patented Nov. 25, 1958

2,862,015

METHOD FOR PRODUCING TRICHLORO-METHYLPROPENE AND CHLOROSULFINATE THEREOF

Donald G. Kundiger and Louis E. Ott, Manhattan, Kans., and Huey Pledger, Jr., Freeland, Mich., assignors to The Dow Chemical Company, Midland, Mich., a corporation of Delaware No Drawing. Application November 3, 1955
Serial No. 544,809

5 Claims. (Cl. 260—456)

This invention is concerned with a novel method for the production of trichloro-methylpropene, and is particularly directed to the employment of a catalyst in such method and to a new compound produced as an intermediate.

It has been suggested in the chemical literature to prepare 3,3,3-trichloro-2-methyl-1-propene by reacting purified 1,1,1-trichloro-2-methyl-2-propanol with an excess of purified thionyl chloride. However, it has been found that commercially produced 1,1,1-trichloro-2-methyl-2-propanol and thionyl chloride frequently will not react as desired to produce trichloro-methylpropene or, if such reaction takes place, the product is contaminated with large amounts of undesired by-products.

It is an object of the present invention to provide an improved method for the preparation of 3,3,3-trichloro-2-methyl-1-propene. It is a further object to provide such method whereby commercially produced reactants may be employed successfully without costly purification before use. Yet another object is to provide a novel crystalline intermediate useful in the production of the trichloromethylpropene. Other objects will become apparent from the following specification and claims.

According to the present invention, it has been discovered that small amounts of amines or their hydrochloride salts catalyze the reaction of 1,1,1-trichloro-2-methyl-2-propanol with thionyl chloride to produce 3,3,3-trichloro-2-methyl-1-propene in high yield. Further, it has been found that by carrying out said reaction in certain reaction solvents, decreased amounts of the thionyl chloride reactant are required. It is among the advantages of the invention that, by operating in accordance therewtih, ordinary commercial thionyl chloride and 1,1,1-trichloro-2-methyl-2-propanol can be employed in the reaction without undesirable reduction in yield or the production of significant amounts of undesired by-products.

It is a further advantage of the invention that, by operating in accordance with a specific embodiment thereof, a novel intermediate, namely, 1,1,1-trichloro-2-methyl-2-propyl chlorosulfinate, can be isolated as a crystalline solid in substantially quantitative yield. This novel chlorosulfinate has utility in the preparation of pure 3,3,3-trichloro-2-methyl-1-propene and for the production of other, more complicated organic derivatives.

The term "amines" as employed in the present specification and claims includes quaternary alkyl ammonium hydroxides as well as alkyl, aryl and heterocyclic amines. Suitable alkyl amines include, for example, primary amines such as tertiarybutyl amine and 1-amino-1,1,3,3-tetramethylbutane, secondary amines such as diethyl amine and di-normalbutylamine, tertiary amines such as methyl-diethyl amine, triethyl amine and tri-isobutyl amine, and quaternary amines such as tetramethylammonium hydroxide and tetraethylammonium hydroxide. Representative aryl amines suitable for use in the practice of the invention, are, for example, aniline, diphenyl amine, N,N-dimethyl aniline, toluidine, naphthyl amines and the like. Representative heterocyclic amines adapted for use in the invention are piperidine, pyridine, lutidines and quinoline. All the above classes of amines may be introduced into the reaction mixture either as the free amine or as the hydrochloride salt thereof. The quaternary amines are conveniently employed as the tetraalkylammonium chlorides.

In carrying out the invention, one molar proportion of 1,1,1-trichloro-2-methyl-2-propanol is heated with at least one molar proportion of thionyl chloride in the presence of a catalytic amount of the amine catalyst. In general, it has been found advantageous to employ the thionyl chloride reactant in the proportion of from about 1.1 to abut 4.0 moles per mole of the substituted propanol in the reaction. A higher molar ratio may be employed if desired. When the reaction is carried out in the absence of a reaction solvent, it has been found necessary to employ excess thionyl chloride in the amount of at least 2 moles per mole of the substituted propanol in the reaction to obtain high yields of the desired trichloro-methylpropene product. In a preferred embodiment of the present invention, it has been found that good yields of the desired trichloro-methylpropene can be obtained when employing only a fraction of a mole of excess thionyl chloride per mole of substituted propanol, provided the reaction is carried out in an inert, non-polar reaction solvent.

Suitable inert, non-polar reaction solvents include liquid cycloaliphatic and aromatic hydrocarbons, such as cyclohexane, benzene and toluene, and chlorinated aliphatic and olefinic hydrocarbons, such as chloroform, carbon tetrachloride, and tetrachloroethylene. In general, it is preferred to employ solvents boiling at from about 60° to about 120° C. In operations wherein such inert reaction solvents are used, it is advantageous to employ from about 100 to about 500 milliliters of solvent per gram-mole of 1,1,1-trichloro-2-methyl-2-propanol in the reaction.

The 1,1,1-trichloro-2-methyl-2-propanol starting material employed in the present invention is available as an article of commerce either in anhydrous or in hydrated form. This material may be employed in the practice of the invention in either form, provided that when the hydrated form is employed a sufficient excess of thionyl chloride is added to react with the water of hydration. Alternatively, when the reaction is carried out in a solvent, the substituted propanol reactant and solvent may be mixed together and a portion of the latter together with the water of hydration distilled out of the reaction vessel prior to the addition of the thionyl chloride reactant. Thionyl chloride in the technical or purified commercial form is suitable for use in the reaction.

In general, the desired reaction is initiated when the substituted propanol and thionyl chloride reactants and amine catalyst are mixed together and heated to a temperature of at least about 40° C. The rate of the reaction increases with increasing temperature and desirable rates are obtained by heating the reaction mixture at temperatures of from about 60° C. up to about 120° C. In most cases it is convenient to carry out the reaction at the boiling temperature of the thionyl chloride or reaction solvent, whichever is lower, and under reflux. When hydrated 1,1,1-trichloro-2-methyl-2-propanol is employed as a starting material, the water content thereof reacts readily with thionyl chloride when the latter is mixed with the substituted propanol at room temperature. Such reaction with the water of hydration is completed rapidly and thereafter the mixture is heated as set forth above to produce the desired trichloro-methylpropene product.

The amount of amine to be employed in the reaction may vary depending upon such factors as the amounts of impurities in the reactants and the particular amine employed provided only that an amount of amine sufficient to catalyze the desired reaction is used. In general, good yields have been obtained when employing from about 0.5 to about 8 mole percent of amine in the reaction mixture, based on the amount of 1,1,1-trichloro-2-methyl-2-propanol used.

On completion of the reaction, the desired 3,3,3-trichloro-2-methyl-1-propene product is separated and any reaction solvent or excess thionyl chloride recovered by fractional distillation at ordinary pressures. In such operations, it is sometimes convenient to separate an intermediate fraction boiling at from about 80° to 125–130° C. containing a portion of the desired product in admixture with thionyl chloride. Such an intermediate fraction may be worked up by cooling and pouring over ice to decompose the thionyl chloride and separate the trichloromethylpropene as a water-immiscible organic layer. The latter is separated, washed with aqueous alkali carbonate solution and dried to obtain the desired trichloro-methylpropene product.

In the preferred embodiment of the invention wherein 1,1,1 - trichloro - 2 - methyl - 2 - propyl chlorosulfinate, having the formula

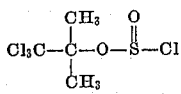

is isolated as an intermediate, 1 mole of the 1,1,1-trichloro-2-methyl-2-propanol is heated with about 2 moles of thionyl chloride in the presence of a catalytic amount of an amine and in an inert reaction solvent as set forth above. In such operation the reaction mixture is heated at gradually increasing temperatures of from about 45° C. to about 80° C. over a period of from about 30 to 90 minutes. On completion of the reaction, as evidenced by the reduction in rate of evolution of hydrogen chloride gas from the reaction mixture, the crude reaction product is cooled in an ice bath. On cooling, the mixture separates into two layers. The oily supernatant layer is removed and the residue, containing the desired chlorosulfinate product, worked up by conventional procedures such as fractional distillation and crystallization to obtain the 1,1,1-trichloro-2-methyl-2-propyl chlorosulfinate product as a crystalline solid. This product may be employed for the production of 3,3,3-trichloro-2-methyl-1-propene by heating, either alone or in the presence of thionyl chloride.

The following examples illustrate the invention but are not to be construed as limiting the same:

Example 1

1,775 grams of commercial, partially hydrated 1,1,1-trichloro-2-methyl-2-propanol (containing about 9.7 moles of said substituted propanol) was mixed at room temperature with 2,900 milliliters (40 moles) of purified thionyl chloride and 10 milliliters (0.085 mole) of quinoline. An initial reaction of the thionyl chloride with the water of hydration of the propanol reactant occurred with the evolution of gas at room temperature. When this initial reaction had subsided, the reaction mixture was heated gradually to a temperature of 65° C. During this heating period, reaction was initiated at a temperature of 40°–45° C. and became vigorous at 65° C. When the rate of evolution of gas at 65° C. subsided, the reaction mixture was heated at 80° C. under reflux for about 18 hours and finally at 100° C. for one hour to complete the reaction. Thereafter the crude reaction product was fractionally distilled at 730 millimeters' pressure to recover unreacted thionyl chloride and to separate product fractions boiling at 80°–129° C., 129°–139° C. and 139°–155° C. The center cut, boiling at 129°–139° C., amounted to 1,355 grams and was substantially pure 3,3,3-trichloro-2-methyl-1- propene, having a refractive index (n/D) of 1.4799 at 20° C. The fraction boiling at 80°–129° C. was poured over ice to decompose unreacted thionyl chloride and the resulting water-immiscible layer separated, washed with aqueous sodium carbonate solution, dried over anhydrous potassium carbonate and filtered to obtain an additional 136.3 grams of slightly impure 3,3,3-trichloro-2-methyl-1-propene (n/D=1.4775 at 20° C.). The fraction boiling at 139°–155° C. weighed 81.6 grams and was found to contain 49.9 percent by weight of 3,3,3-trichloro-2-methyl-1-propene. The overall yield of the desired propene product was 96 percent of theoretical.

Example 2

1600 grams of partially hydrated 1,1,1-trichloro-2-methyl-2-propanol was dissolved in 2,080 milliliters of carbon tetrachloride and the mixture distilled to remove the water of hydration as the carbon tetrachloride-water azeotrope. By this means 50 milliliters (2.78 moles) of water was separated and about 740 milliliters of codistilled carbon tetrachloride recovered.

The residue from the above distillation, consisting of about 1340 milliliters of carbon tetrachloride and 8.74 moles of substantially anhydrous 1,1,1-trichloro-2-methyl-2-propanol, was mixed with 750 milliliters (10 moles) of thionyl chloride and 3 milliliters (.026 mole) of quinoline. The resulting mixture was heated to initiate reaction and then maintained at a temperature of about 70° C. under reflux for a period of about 11 hours. Thereafter the crude reaction mixture was fractionally distilled at atmospheric pressure to recover the solvent and unreacted thionyl chloride and to separate the 3,3,3-trichloro-2-methyl-1-propene product, boiling at 130°–140° C. and amounting to a yield of 82 percent of theoretical.

Example 3

500 milliliters of dry carbon tetrachloride, 145 milliliters (2 moles) of purified thionyl chloride, 177.5 grams (1 mole) of anhydrous 1,1,1-trichloro-2- methyl-2-propanol and 5 milliliters (0.06 mole) of pyridine were mixed together at room temperature and heated gradually up to a temperature of 76° C. during a period of one hour. On heating, reaction was initiated and when the temperature of the reaction mixture reached 50° C., rapid evolution of hydrogen chloride was observed. On completion of the reaction, as evidenced by the reduced rate of evolution of hydrogen chloride, the reaction vessel and contents were cooled with an ice bath. The crude reaction product formed two layers. The oily supernatant layer was separated and the residue maintained under partial vacuum for a period of time to accomplish removal of volatile solvent and unreacted thionyl chloride and to obtain as a residue 1,1,1-trichloro-2-methyl-2-propyl chlorosulfinate in the form of white crystals melting at 55°–56° C. in a sealed tube. The yield of crystalline sulfinate amounted to 251 grams (98 percent of theoretical).

125 grams of the 1,1,1 - trichloro - 2 - methyl - 2-propyl chlorosulfinate was dissolved in 107 milliliters of thionyl chloride and 2.5 milliliters of pyridine added thereto. The resulting mixture was heated to 80° C. and maintained at such temperature under reflux for a period of 7 hours. Thereafter the crude reaction product was fractionally distilled and worked up as in Example 1 to obtain a purified 3,3,3 - trichloro - 2 - methyl - 1 - propene product with a yield of 78.4 percent of theoretical.

Example 4

A series of reactions was carried out, employing various amines as catalysts. In each such reaction, 186.5 grams (1 mole) of the hemihydrate of 1,1,1-tricoloro-2-methyl-2-propanol was mixed with 7 to 70 millimoles of an amine and 290 milliliters (4 moles) of technical thionyl chloride added thereto portionwise. On completion of the room-temperature reaction between the thionyl chloride and the water of hydration of the substituted propanol reactant, the mixture was heated to the reflux temperature of thionyl chloride and maintained at such temperature until the evolution of acidic gases had essentially ceased Thereafter, the reaction mixture was fractionally distilled to recover unused thionyl chloride and to separate product fractions boiling at 80°–129° C., 129°–139° C. and 139°–155° C. The fraction boiling at 80°–129° C. was worked up as in Example 1 and combined with the 129°–139° fraction. The types and amounts of catalyst, reaction times and yields of 3,3,3-trichloro-2-methyl-1-propene are set forth in the following table:

| Amine Catalyst | Mole Percent of Catalyst | Reaction Time In Hours | Yield, Percent |
| --- | --- | --- | --- |
| Aniline | 6.3 | 7.5 | 79 |
| Aniline Hydrochloride | 2.4 | 10 | 78 |
| Mono-tertiarybutyl amine | 0.7 | 6.5 | 79 |
| 1-Amino-1,1,3,3-tetramethylbutane | 0.7 | 6.5 | 74 |
| Di-normalbutyl amine | 4.0 | 6 | 78 |
| Piperidine | 1.0 | 7 | 79 |
| Diphenyl amine | 3.5 | 7.5 | 76 |
| N,N-dimethyl aniline | 5.5 | 9 | 83 |
| Triethyl amine | 5.0 | 7.5 | 83 |
| Pyridine | 1.2 | 6 | 83 |
| Tetramethylammonium chloride | 2.0 | 7.5 | 82 |

In the above table the mole percent of catalyst is based on the amount of 1,1,1-trichloro-2-methyl-2-propanol and the yields are expressed as percent of theoretical.

The product 3,3,3-trichloro-2-methyl-1-propene previously has been employed as in British Patent No. 660,475 to produce the compound 1,1,3-trichloro-2-methyl-1-propene. The latter compound is disclosed in United States patent application Serial No. 294,265, filed June 18, 1952 and now U. S. Patent No. 2,745,884 as an intermediate in the production of halophenyl dichloro-methylpropenes having value as toxic ingredients in insecticidal compositions for the control of aphids and spider mites.

We claim:

1. A method for the preparation of 3,3,3-trichloro-2-methyl-1-propene which comprises reacting 1,1,1-trichloro-2-methyl-2-propanol with thionyl chloride in the presence of a catalytic amount of an amine and at a temperature of from about 40° C. to about 120° C.

2. A method for the preparation of 3,3,3-trichloro-2-methyl-1-propene which comprises heating one molar proportion of 1,1,1-trichloro-2-methyl-2-propanol with at least one molar proportion of thionyl chloride at a temperature of from about 40° C. to about 120° C. in the presence of a catalytic amount of an amine.

3. A method according to claim 2 wherein the amine is employed in the amount of from about 0.5 to about 8 mole percent based on the amount of 1,1,1-trichloro-2-methyl-2-propanol in the reaction.

4. A method according to claim 2 wherein the reaction is carried out in an inert, non-polar reaction solvent.

5. A method for producing 1,1,1-trichloro-2-methyl-2-propyl chlorosulfinate which comprises heating one molar proportion of 1,1,1-trichloro-2-methyl-2-propanol with about 2 molar proportions of thionyl chloride in the presence of a catalytic amount of an amine in an inert, non-polar, reaction solvent, and at a temperature of from about 45° C. to about 80° C. for a period of time until the evolution of hydrogen chloride from the reaction mixture has substantially ceased.

References Cited in the file of this patent

UNITED STATES PATENTS

| | | |
| --- | --- | --- |
| 2,046,090 | Reed | June 30, 1936 |
| 2,529,494 | Harris et al. | Nov. 14, 1950 |
| 2,576,139 | Pechukas | Nov. 27, 1951 |

FOREIGN PATENTS

| | | |
| --- | --- | --- |
| 153,020 | Australia | Nov. 29, 1950 |
| 657,580 | Great Britain | Sept. 19, 1951 |

OTHER REFERENCES

McElvain et al.: Jour. Amer. Chem. Soc., 69–2667–70 (1947).